(12) United States Patent
Kelly et al.

(10) Patent No.: US 6,515,443 B2
(45) Date of Patent: Feb. 4, 2003

(54) PROGRAMMABLE PULSE WIDTH MODULATED WAVEFORM GENERATOR FOR A SPINDLE MOTOR CONTROLLER

(75) Inventors: David W. Kelly, Anoka, MN (US); Jason P. Brenden, Eagan, MN (US); Michael J. Peterson, Eagan, MN (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/862,776

(22) Filed: May 21, 2001

(65) Prior Publication Data
US 2002/0171386 A1 Nov. 21, 2002

(51) Int. Cl.⁷ .............................................. G05B 11/28
(52) U.S. Cl. ..................... 318/599; 318/254; 318/138; 318/439; 318/567; 318/569; 318/811; 388/804; 388/811; 388/815; 388/806
(58) Field of Search ................................ 318/254, 439, 318/138, 811, 801, 599, 567, 569; 388/800, 804, 806, 811, 815

(56) References Cited

U.S. PATENT DOCUMENTS

| | | | | |
|---|---|---|---|---|
| 4,849,871 A | * | 7/1989 | Wallingford | 318/811 |
| 6,020,695 A | | 2/2000 | Kelly et al. | 318/49 |
| 6,331,757 B1 | * | 12/2001 | Makaran | 318/254 |

* cited by examiner

Primary Examiner—Jonathan Salata
Assistant Examiner—Rina I. Duda
(74) Attorney, Agent, or Firm—Kinney & Lange, P.A.

(57) ABSTRACT

A motor controller for a three-phase spindle motor used in the hard disc drive provides pulse width modulated (PWM) signals used to drive the motor. The PWM signals have duty cycles which are a function of rotational position of the motor, a magnitude control signal, a stored set of main waveform coefficients, a stored set of modifier coefficients, and a modifier signal. By varying the modifier signal, the duty cycle of the PWM signals can be varied to adjust the shape of the motor current waveform to match the torque profile of the motor.

13 Claims, 6 Drawing Sheets

PROGRAMMABLE PULSE WIDTH MODULATED WAVEFORM GENERATOR FOR A SPINDLE MOTOR CONTROLLER

CROSS-REFERENCE TO RELATED APPLICATION(S)

None.

BACKGROUND OF THE INVENTION

The present invention is a motor controller for three-phase DC motors. In particular, the invention relates to programmable pulse width modulated drive for a three-phase DC motor such as a spindle motor used in hard disc drives.

Pulse width modulation techniques are commonly used to drive three-phase DC spindle motors in hard disc drives. The motor controller circuit varies the duty cycle of the driving waveform so that a sensed average motor current matches a current command signal representing a desired motor speed.

If the motor current waveform does not match the torque profile of the motor, the motor will create time varying forces on the spinning disc. This can excite mechanical resonances in the hard disc drive assembly, which can result in audible harmonic tones. The reduction or elimination of audible harmonic tones in disc drives is a concern to disc drive manufacturers. Inexpensive ways to reduce audible harmonic tones continue to be sought.

Driving the three windings of the DC motor with appropriate waveforms can minimize torque ripple. If the torque profile for each stator motor coil is sinusoidal, each motor terminal should be driven with a sinusoidal signal to create a flat torque waveform. A sinusoidal driving current can be accomplished by pulse width modulating the DC source voltage during each of the three phases. Sinusoidal pulse width modulation requires all three windings be driven simultaneously, with one winding being driven high and the other two windings being modulated by driving them high or low or not at all to shape the driving signal. See, for example, T. Kenjo, *Electric Motors and Their Controls*, Oxford Press, (1991), pp. 134–136.

Many existing motor controller circuits contain a table of wave shaping coefficients that are multiplied by the current demand to determine the drive signal pulse widths which are provided to the motor. Each coefficient corresponds to a particular motor electrical rotational position. Since the three-phase motor is symmetric, each coefficient can be used for a number of positions that are evenly distributed over one full electrical rotation (i.e., 360°). In some implementations, the wave shaping coefficients are fixed and stored in a read-only memory (ROM). The use of fixed coefficients does not allow for adjustment of the coefficients to match the torque profile of a particular motor design. To address this issue, some motor controller circuits provide for programmable coefficients which are supplied via a serial port and are stored in a register memory of the motor controller. This programmable coefficient approach, however, has several disadvantages. The use of programmable coefficients to tune the spindle motor waveform typically requires 75 or more register bits. This uses scarce register space and die area on the motor controller circuit chip. It also adds tuning complexity for the hard disc drive manufacturer.

BRIEF SUMMARY OF THE INVENTION

The motor controller of the present invention drives a three-phase motor with a waveform that can be varied using a waveform modifier signal which represents only a small number of programmable control bits. A pulse width modulation (PWM) controller provides a pulse width modulated clock signal used to drive the motor. The pulse width modulation clock signal has a duty cycle which is a function of a rotational position of the motor, a magnitude control signal, and the modifier signal.

The PWM controller includes a main lookup table which stores coefficients as a function of an electrical rotational position of the motor. The main lookup table coefficients will control the duty cycle of the pulse width modulated clock signal to provide a basic waveform such as, for example, a sinusoidal drive waveform.

The PWM controller also includes a modifier lookup table which contains modifier coefficients as a function of electrical rotational position. When the modifier coefficients are combined with the main coefficients, the result is a waveform of a second, different shape, such as a trapezoidal waveform shape.

The modifier signal selects the extent to which the modifier coefficient is used to modify the main coefficient. By selectively varying the combination of the modifier coefficients with the main coefficients, a family of different drive waveforms can be produced.

DETAILED DESCRIPTION

Figure 1:
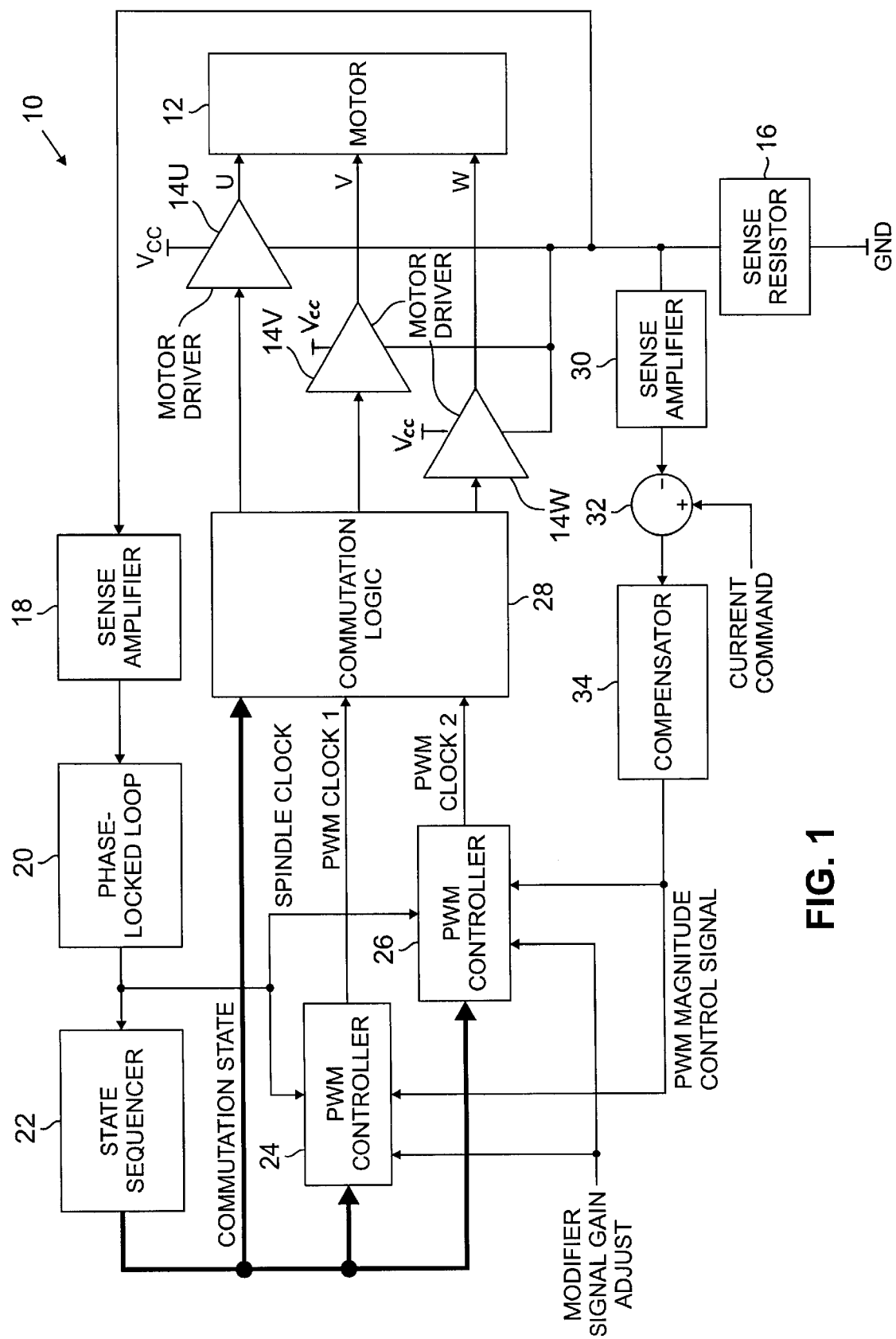
FIG. 1 is a block diagram of the spindle motor controller of the present invention.

FIG. 1 is a block diagram of spindle motor system 10, which includes spindle motor 12, motor drivers 14U, 14V, and 14W, sense resistor 16, sense amplifier 18, phase-locked loop 20, state sequencer 22, pulse width modulator (PWM) controllers 24 and 26, commutation logic 28, sense amplifier 30, difference amplifier 32, and compensator 34. Except for spindle motor 12, and compensator 34, all of the components shown in FIG. 1 preferably are implemented in an integrated circuit.

Motor 12 is a three-phase DC motor having three terminals labeled U, V, and W. Motor 12 is energized by drive signals supplied by motor drivers 14U, 14V, and 14W which are connected to terminals U, V, and W, respectively. Each motor driver 14U, 14V, 14W is a half bridge circuit which connects its respective terminal to either positive supply ($V_{CC}$) or sense resistor 16.

During each 120° of electrical rotation of motor 12, one motor terminal is connected to positive supply $V_{CC}$, while the other two terminals are pulse width modulated to create a selected motor waveform across the motor windings and to control a motor current.

The ground return path from motor 12 through motor drivers 14U, 14V, and 14W to ground GND is through sense resistor 16. The motor current flowing through motor 12 and the motor drivers 14U–14W passes through sense resistor 16, which typically has a resistance of between about 0.05 and 0.2 ohms.

The voltage across sense resistor 16 is sampled and amplified by sense amplifier 18. The output signal from sense amplifier 18 is fed to phase-locked loop 20 and is used to cause a charge pump within phase-locked loop 20 to either pump up or pump down. The output of phase-locked loop 20 is a Spindle Clock signal which is phase locked to motor position. In a preferred embodiment, the Spindle Clock signal provides a clock pulse for every 6° of motor electrical rotation.

Sense amplifier 18 and phase-locked loop 20 receive clock signals from commutation logic 28 which enable sense amplifier 18 to sample the voltage across sensor resistor 16 during a time period when one of the motor terminals is tied to a $V_{CC}$, while the other two terminals are pulsed to ground. As a result, the current flowing through sense resistor 16 is equal to the current flowing into the terminal which is tied to $V_{CC}$. By sampling in this manner, sense amplifier 18 is able to compare the two halves of the 120° of electrical rotation and produce a signal to the phase-locked loop 20 so that the first half of the 120° of sampled current is equal to the second half of the 120° of sampled current in the steady state. In other words, phase-locked loop 20 locks on to the shape of the current waveform and is adjusted to make the shape of the current waveform symmetric between the first and second halves of each 120° of rotation. Phase-locked loop 20 produces twenty Spindle Clock pulses for each 120° of rotation, or one pulse every 6° of rotation. The number of bits is implementation specific, both in terms of position resolution (3° vs. 6° for example) and bit decode (binary vs. grey code).

Phase-locked loop 20 provides the spindle clock signal to state sequencer 22 as well as to pulse width modulator controllers 24 and 26. State sequencer 22 tracks motor rotational position in response to the spindle clock pulses which it receives. The spindle clock pulses occur every 6°. State sequencer 22 provides, as part of a Commutation State output, four bits which change every 6° of the rotation. In addition, state sequencer 22 provides six bits which change every 60° of rotation. With these six bits, one bit is high during each 60° of rotation. Two of the six bits are associated with each of the three motor terminals U, V, and W. If either of the two bits associated with a particular motor terminal is high, then commutation logic 28 will cause the motor driver associated with that terminal to connect the terminal to $V_{CC}$. The other two motor drivers will receive the PWM Clock 1 signal and PWM Clock 2 signal from PWM controllers 24 and 26, respectively. Commutation logic 28 uses the Commutation State code to determine which motor terminal is driven high, which motor terminal is driven by the PWM Clock 1 signal, and which motor terminal is driven by the PWM Clock 2 signal.

The PWM Magnitude Control signal is generated by subtracting, at difference amplifier 32, the Current Sense signal which is the output of sense amplifier 30 from a Current Command signal which represents a desired average motor current. In general, higher current results in higher motor speed.

The difference output of difference amplifier 32 is filtered using compensator 34 to produce the PWM Magnitude Control signal. Compensator 34 includes a filter which is used to compensate for the motor pole and to set the loop bandwidth.

In general, when the PWM Magnitude Control signal increases, this indicates that the Current Sense signal is too low compared to the Current Command signal. Conversely, if the PWM Magnitude Control signal decreases, this indicates that the Current Sense signal is too high relative to the Current Command signal.

An increase in the PWM Magnitude Control signal causes PWM controllers 24 and 26 to increase the duty cycle of the PWM Clock 1 and PWM Clock 2 signals. An increase in duty cycle produces more current through motor 12. In other words, if PWM Clock 1 and PWM Clock 2 have a duty cycle which increases, the two motor drivers which receive those two signals will drive their respective motor terminals low for a larger portion of each cycle of the PWM Clock 1 or PWM Clock 2 signals.

PWM controllers 24 and 26 contain stored coefficients representing a main or base waveform, as well as modifier coefficients which are used to modify the main coefficients to modify the waveform shape. With each 6° electrical rotation of motor 12, a new Commutation State code is received from state sequencer 22 by PWM controllers 24 and 26. The appropriate stored main coefficient and a modifier coefficient for that particular Commutation State code are combined as a function of the Modifier Signal Gain Adjust signal, and the combined coefficient is multiplied by the PWM Magnitude Control signal to control the duty cycle of the PWM Clock 1 or PWM Clock 2 signal. Every 6° of rotation, (and therefore 60 times during a full electrical revolution of motor 12) the duty cycles of the PWM Clock 1 and PWM Clock 2 signals are selected as a function of the Commutation State (indicating rotational position of the motor), the stored main and modifier coefficients, the Modifier Signal Gain Adjust signal, and the PWM Magnitude Control signal.

The present invention provides a family of waveforms which can be used to drive three-phase motor 12. This family of waveforms allows the user to fine tune a motor drive waveform for a particular motor with very little additional circuitry beyond that required for a purely sinusoidal motor drive waveform.

Figure 2:
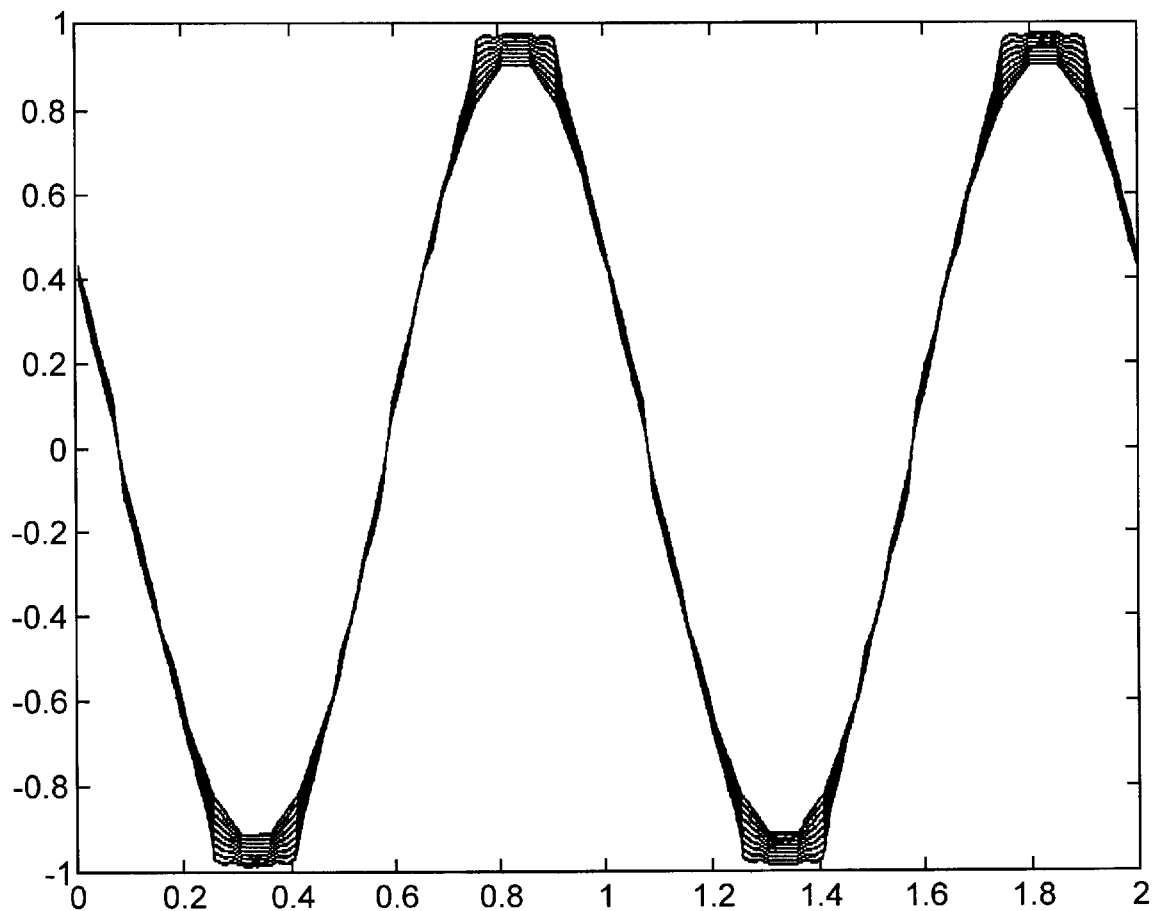
FIG. 2 is a diagram showing selectable motor controller waveforms produced by the spindle motor controller of FIG. 1.

FIG. 2 shows a family of eight selectable motor controller waveforms which are selectable using only three control bits used to produce the Modifier Signal Gain Adjust signal. The family of waveforms shown in FIG. 2 is based upon the assumption that the optimal motor drive waveform for a spindle motor lies somewhere between a sinusoidal and a trapezoidal waveform. Each waveform represents a composite signal driven to each motor terminal U, V, and W with respect to the center tap of the spindle motor. The actual signals at the motor terminals U, V, and W are digital in that each terminal is connected to ground or to the positive supply. The composite waveforms are created by varying the duty cycle of the digital signal across each of the three windings, where zero on the vertical axis in FIG. 2 represents a 50% duty cycle.

Figure 3:
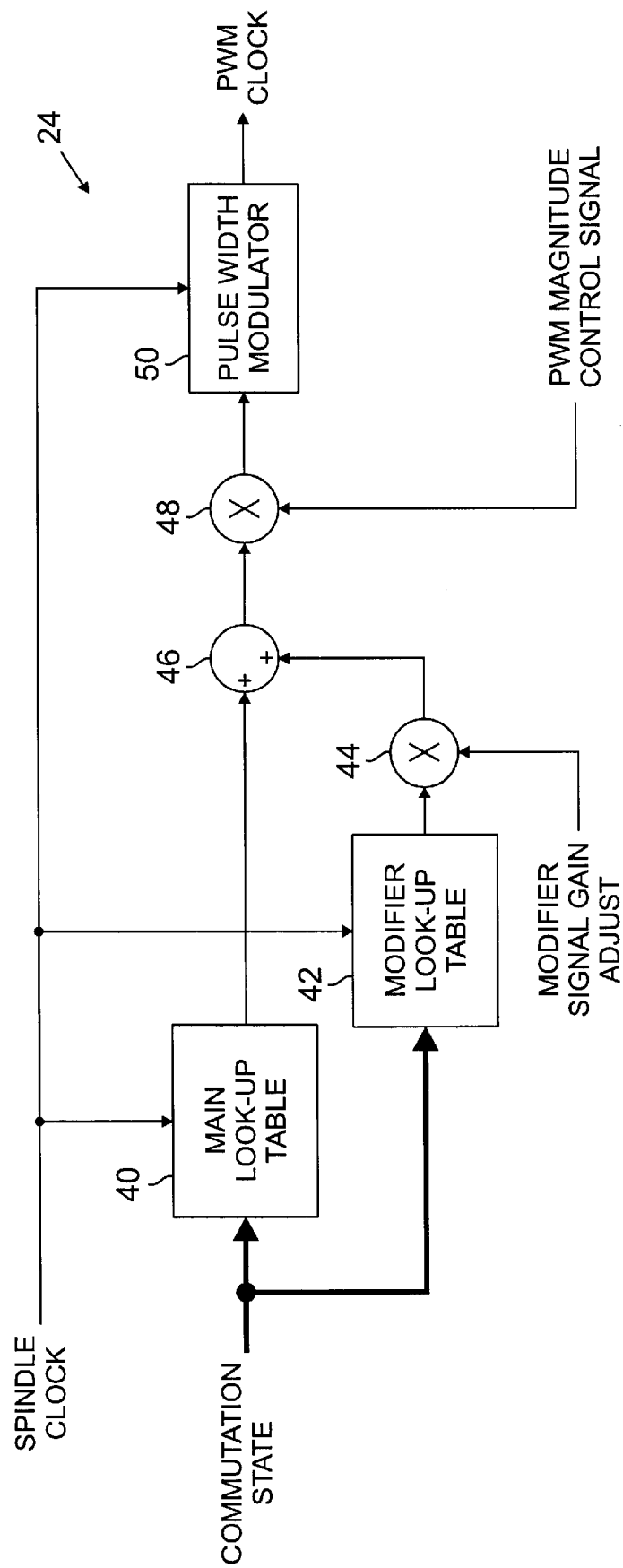
FIG. 3 is a block diagram of the pulse width modulation controller used in the motor controller of FIG. 1.

FIG. 3 shows a block diagram of PWM controller 24. The structure of PWM controller 26 is identical, and therefore the discussion of FIG. 3 applies to both PWM controllers 24 and 26.

As shown in FIG. 3, PWM controller 24 includes main lookup table 40, modifier lookup table 42, multiplier 44, adder block 46, multiplier 48, and pulse width modulator 50. Main lookup table 40 contains the necessary coefficients to create a sinusoidal waveform across the windings of motor 12. These coefficients are adjusted to reflect that one motor terminal is held high, so that the net differential signal across each motor winding is sinusoidal.

Figure 4:
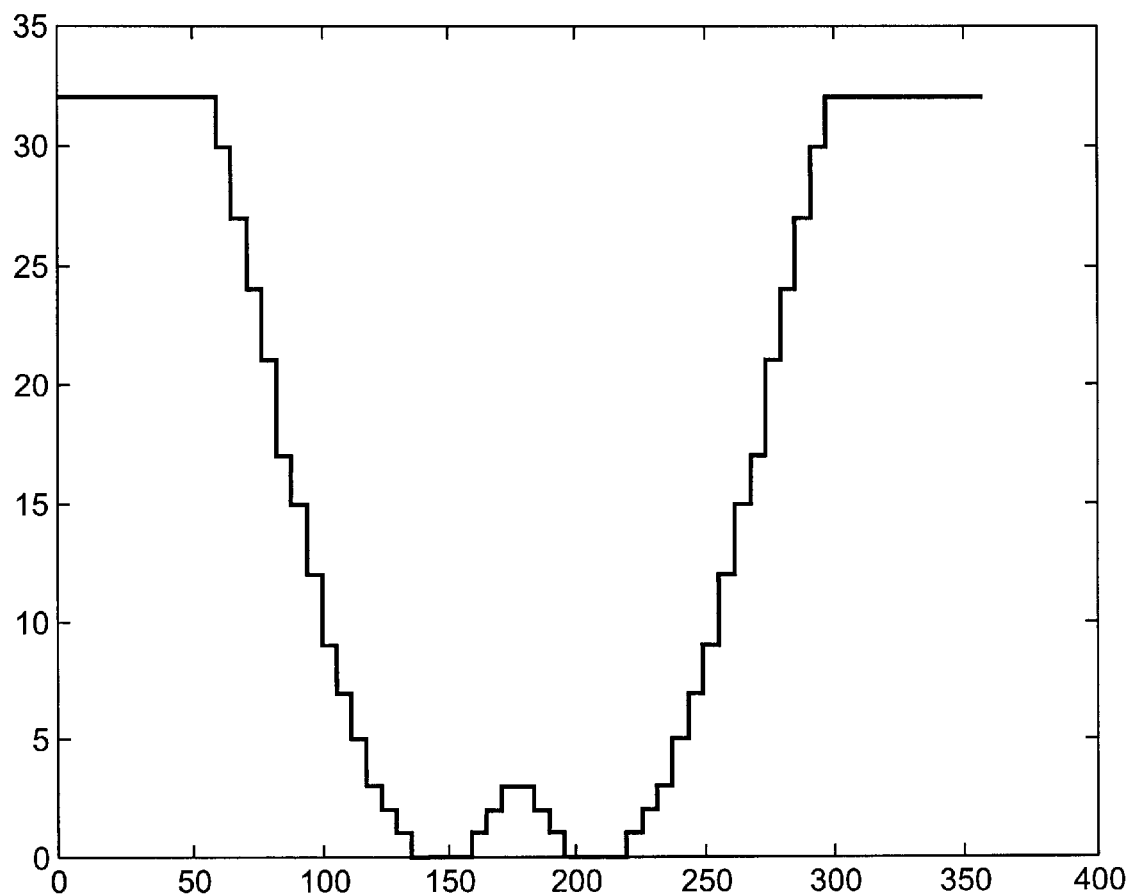
FIG. 4 is a diagram showing sine wave main coefficients stored in a main lookup table of the pulse width modulation controller of FIG. 3.

FIG. 4 shows the main lookup table coefficients selected for each motor terminal as motor 12 moves through one full electrical rotation (360°). A coefficient of "32" is symbolic of no pulse width modulation as one of the terminals is held high for 120°. The coefficients "0" to "31" shown in FIG. 4 are defined by only five bits and are used in defining the duty cycle of pulse width modulation. As seen in FIG. 4, the coefficients are symmetric about 180°. It is possible to take advantage of this symmetry by constructing main lookup table 40 so that it contains only half of the waveform, and then reversing the decode in response to the Commutation State code for the other half of the waveform.

Figure 5:
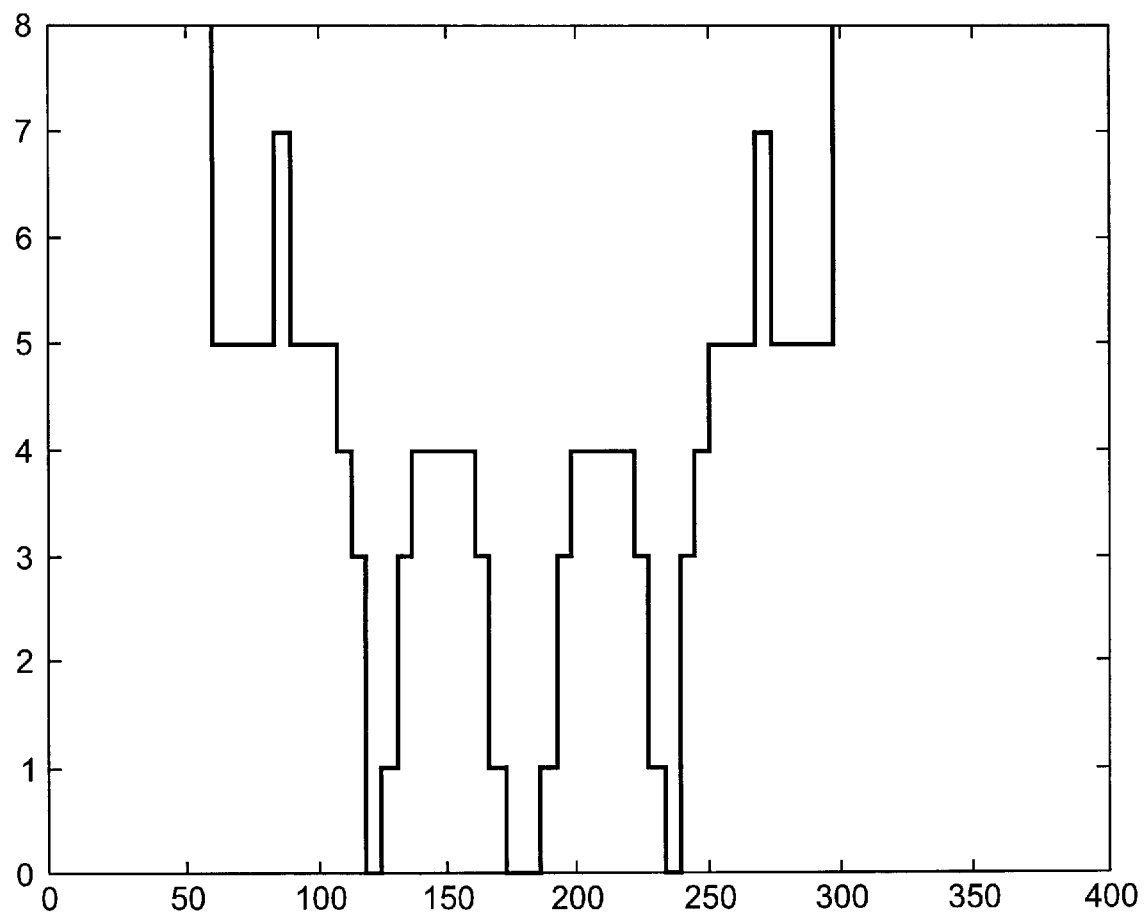
FIG. 5 is a graph showing modifier coefficients stored in a modifier lookup table of the pulse width modulation controller.

Modifier table 42 contains a set of coefficients that represent the difference between a sinusoidal and a trapezoidal waveform. The modifier coefficients are shown in FIG. 5. A coefficient of "8" is symbolic of no pulse width modutation. Three bits are used to produce the modifier coefficients "0" to "7" in the embodiment illustrated in FIG. 5.

Multiplier 44 multiplies the modifier coefficient supplied by modifier look-up table 42 for a particular Commutation State code by the Modifier Signal Gain Adjust value. Three bits can be used to produce eight different Modifier Signal Gain Adjust values, and thus a family of eight different waveforms such as illustrated in FIG. 2 can be produced. The Modifier Signal Gain Adjust value selects the desired waveform by selecting the multiplication factor to be used with the modifier coefficients.

Figure 6:
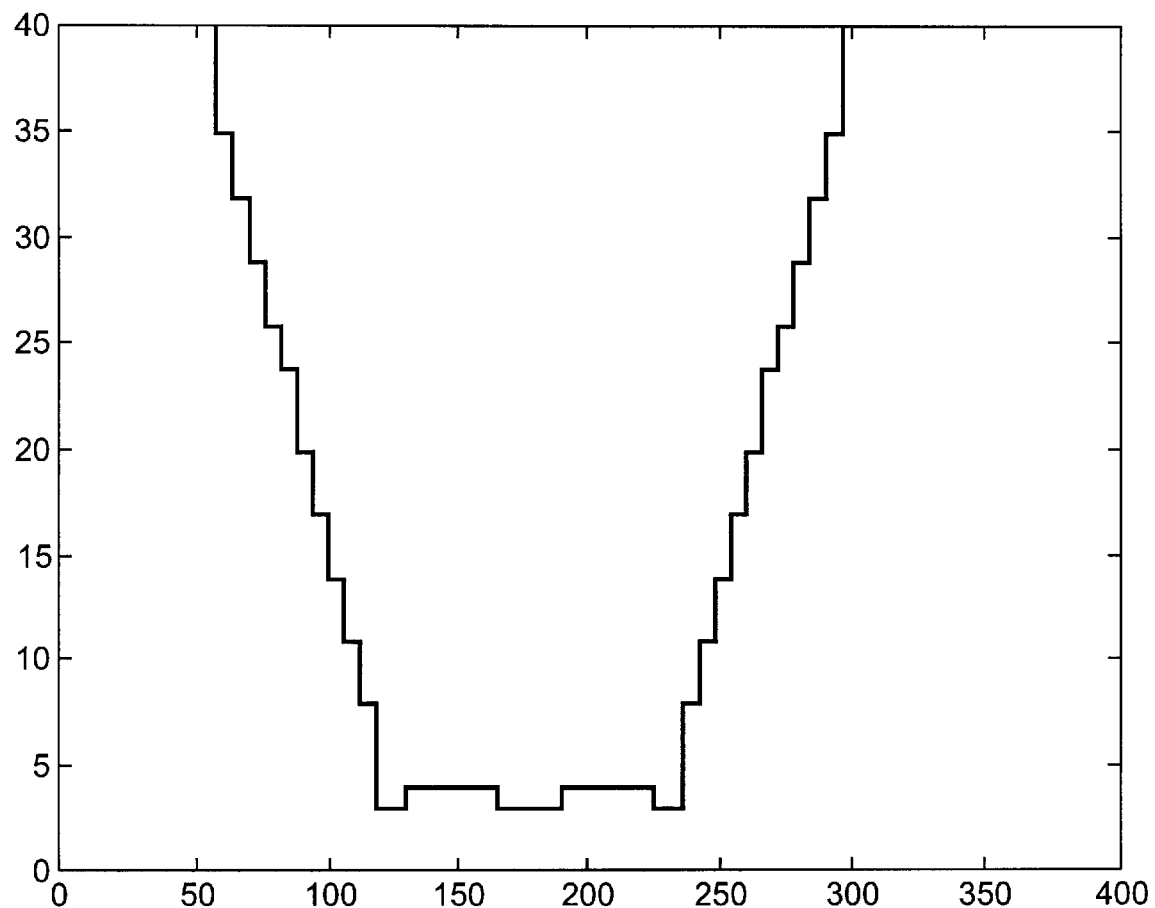
FIG. 6 is a graph showing a summation of the modifier and the sign wave coefficients with maximum modifier gain.

The main coefficient from main lookup table 40 and the multiplied modifier coefficient from modifier lookup table 42 and multiplier 44 are summed by adder block 46 to create a modified coefficient. If the Modifier Signal Gain Adjust value is zero, then the modifier coefficients will be zero, and the output of adder block 46 will be only the main coefficient produced by main lookup table 40. On the other hand, if the Modifier Signal Gain Adjust value is non-zero, then a modified coefficient will be generated by the addition of the main coefficient and the adjusted modifier coefficient. FIG. 6 shows the summation of the main coefficients with the modifier coefficients when the Modifier Signal Gain Adjust value is at its maximum setting.

The PWM Magnitude Control signal and the modified coefficient from adder 46 are multiplied by multiplier 48 to produce a duty cycle control signal to the input of pulse width modulator 50. Pulse width modulator 50 generates the PWM Clock 1 signal which has a duty cycle proportional to the duty cycle control signal. The larger the duty cycle, the longer a terminal is connected to ground, so that as duty cycle increases, the average current through motor 12 increases.

The PWM controller circuitry shown in FIG. 3 can be implemented with either digital or analog circuitry. In an analog implementation, main lookup table 40 and modifier lookup table 42 have digital-to-analog converter (DAC) circuitry included which converts the main and modifier coefficients to analog values. In the analog implementation, the Modifiers Signal Gain Adjust value is an analog signal which is produced by converting a digital value (e.g., three bits represent eight different waveform shapes) to an analog signal.

This invention provides a simple way to fine tune the motor drive waveform to match the characteristics of a particular spindle motor while using very little additional circuitry beyond that required for purely sinusoidal motor drive waveform. This is particularly advantageous for disc drive manufacturers, who are concerned with mismatches of the motor current waveform to the torque profile which can produce mechanical resonance and audible harmonic tones. The additional circuitry required by the present invention beyond that for a purely sinusoidal drive are modifier lookup table 42, multiplier 44, and adder block 46. All of these elements can be implemented using a small amount of digital or analog circuitry. The present invention avoids the need to store large numbers of coefficients in order to provide adjustments to match the torque profile to a particular motor design. With the present invention, the tuning of the waveforms to the torque profile of the motor is simplified, since it involves changing only a small number of bits representing the Modifier Signal Gain Adjust value.

Although the present invention has been described with reference to preferred embodiments, workers skilled in the art will recognize that changes may be made in form and detail without departing from the spirit and scope of the invention.

What is claimed is:

1. A motor controller for an electric motor which provides pulse width modulated drive signals to the electric motor, the motor controller including:
    a control circuit for providing a magnitude control signal for controlling motor speed;
    an input for receiving a modifier signal representing a selected waveform shape;
    a position determining circuit for determining rotational position of the motor; and
    a pulse width modulation (PWM) controller for controlling duty cycles of the pulse width modulated drive signals as a function of a stored set of main waveform coefficients, a stored set of modifier coefficients, the rotational position of the motor, the magnitude control signal, and the modifier signal.

2. The motor controller of claim 1 wherein the PWM controller comprises:
    a main waveform look-up table for providing the set of main waveform coefficients as a function of rotational position of the motor;
    a modifier look-up table for providing the set of modifier coefficients as a function of rotational position of the motor;
    a duty cycle control for producing a duty cycle control signal as a function of the main waveform coefficients, the modifier coefficients, the modifier signal, and the magnitude control signal; and
    a pulse width modulator for producing a pulse width modulated drive signal as a function of the duty cycle control signal.

3. The motor controller of claim 2, wherein the a duty cycle control comprises:
    a first multiplier for multiplying the modifier coefficients by the modifier signal to produce adjusted modifier coefficients;
    an adder for adding the main waveform coefficients and the adjusted modifier coefficients to produce combined coefficients; and
    a second multiplier for multiplying the combined coefficients by the magnitude control signal to produce the duty cycle control signal.

4. The motor controller of claim 1, wherein the motor controller is fabricated in an integrated circuit.

5. A motor controller for an electrical motor, the motor controller comprising:
    a plurality of motor drivers for connection to the electrical motor;

commutation logic for providing motor drive signals to the motor drivers as a function of a commutation state code and pulse width modulation clock signals;

a control circuit for providing a first control signal which represents current demand;

an input for receiving a second control signal which represents a selected waveform shape formed by a combination of a stored first set of coefficients and a stored second set of coefficients; and a pulse width modulation controller for providing the pulse width modulation clock signals as a function of the stored first set of coefficients, the stored second set of coefficients, the first control signal, and the second control signal.

6. The motor controller of claim 5 and further comprising:

a control circuit for providing the first control signal as a function of sensed motor current and a current command signal.

7. The motor controller of claim 5 wherein the pulse width modulation controller comprises:

a first look-up table for providing the first set of main waveform coefficients as a function of rotational position of the motor;

a second look-up table for providing the second set of coefficients as a function of rotational position of the motor;

a duty cycle control for producing a duty cycle control signal as a function of the first and second sets of coefficients, the first control signal, and the second control signal; and a pulse width modulator for producing a pulse width modulated drive signal as a function of the duty cycle control signal.

8. The motor controller of claim 6, wherein the duty cycle control comprises:

a first multiplier for multiplying the second set of coefficients by the second control signal to produce adjusted second coefficients;

an adder for adding the first and adjusted second coefficients to produce combined coefficients; and a second multiplier for multiplying the combined coefficients by the first control signal to produce the duty cycle control signal.

9. The motor controller of claim 5, wherein the motor controller is fabricated in an integrated circuit.

10. A method of producing a pulse width modulation clock signal having a variable duty cycle as a function of rotational position of a motor, the method comprising:

storing a first set of coefficients for different rotational positions;

storing a second set of coefficients for different rotational positions;

selecting coefficients from the first and second sets based upon rotational position;

combining the coefficients selected as a function of an adjust signal to produce a combined coefficient; and providing the pulse width modulation clock signal with a duty cycle which is a function of the combined coefficient.

11. The method of claim 10 and further comprising:

providing a magnitude control signal as a function of sensed motor current and a current command signal; and producing a duty cycle control signal which controls the duty cycle based upon the combined coefficient and the magnitude control signal.

12. A motor controller for an electric motor which provides pulse width modulated drive signals to the electric motor, the motor controller including:

means for providing a magnitude control signal for controlling motor speed;

means for receiving a modifier signal representing a selected waveform shape;

means for determining rotational position of the motor; and a main waveform look-up table for providing the set of main waveform coefficients as a function of rotational position of the motor;

a modifier look-up table for providing the set of modifier coefficients as a function of rotational position of the motor;

a duty cycle control for producing a duty cycle control signal as a function of the main waveform coefficients, the modifier coefficients, the modifier signal, and the magnitude control signal; and a pulse width modulator for producing a pulse width modulated drive signal as a function of the duty cycle control signal.

13. A motor controller for an electrical motor, the motor controller comprising:

a control circuit for providing a magnitude control signal for controlling motor speed;

an input for receiving a modifier signal representing a selected waveform shape;

a first look-up table for providing the first set of main waveform coefficients as a function of rotational position of the motor;

a second look-up table for providing the second set of coefficients as a function of rotational position of the motor;

a duty cycle control for producing a duty cycle control signal as a function of the first and second sets of coefficients, the first control signal, and the second control signal; and a pulse width modulator for producing a pulse width modulated drive signal as a function of the duty cycle control signal.

* * * * *

UNITED STATES PATENT AND TRADEMARK OFFICE
CERTIFICATE OF CORRECTION

PATENT NO.     : 6,515,443 B2
DATED          : February 4, 2003
INVENTOR(S)    : David W. Kelly et al.

It is certified that error appears in the above-identified patent and that said Letters Patent is hereby corrected as shown below:

<u>Title page,</u>
Item [75], Inventors, "David W. Kelly" delete "Anoka", insert -- Lino Lakes --

Signed and Sealed this

Twenty-third Day of December, 2003

JAMES E. ROGAN
*Director of the United States Patent and Trademark Office*